2,785,117
Patented Mar. 12, 1957

2,785,117

HIGH SPEED COPPER CYANIDE PLATING

Myron Ceresa, Penn Township, Allegheny County, and Richard E. Woehrle, Trafford, Pa., assignors to Westinghouse Electric Corporation, East Pittsburgh, Pa., a corporation of Pennsylvania No Drawing. Application September 24, 1954,
Serial No. 458,256

6 Claims. (Cl. 204—52)

This invention relates to a novel high speed copper cyanide electrolyte and a method of plating therewith.

Economical plating practice demands that as high a current density as possible be used in order to shorten the time of the plating operation. Further, the use of high current densities would afford a material reduction in the size of automatic plating machines now being used extensively.

An object of this invention is to provide a high speed copper cyanide aqueous plating electrolyte in which the essential cations are substantially entirely copper and lithium.

A further object of the invention is to provide an alkali metal copper cyanide electroplating electrolyte having as its essential alkali metal ions of lithium and a minor proportion of sodium or potassium, or both.

A further object of this invention is to provide a process for plating high quality copper rapidly from a lithium copper cyanide plating electrolyte through which an electrical current is passed at current densities up to 400 amperes per square foot for flat panels.

Other objects of the invention will, in part, be obvious and will, in part, appear hereinafter.

For a better understanding of the nature and objects of the invention, reference should be had to the following detailed description.

We have discovered a novel high speed cyanide copper electroplating electrolyte in which the cation is composed substantially completely of copper and lithium. This novel electrolyte will permit the passing of electrical currents therethrough at current densities up to 400 amperes per square foot at the cathode, the cathode being a flat panel. The maximum current densities that can be used in the conventional copper cyanide electroplating electrolytes in use up to this invention have been about 70 to 100 amperes per square foot under the same operating conditions for equal quality. The lithium formulation of the electrolyte of this invention is not any more expensive to plate from than the conventional electrolytes being widely used today.

The electrolyte of this invention is composed of an aqueous solution containing from 8 to 15 ounces per gallon of copper as metal, the copper being present as the cyanide, enough lithium hydroxide to provide a pH of at least 12, and lithium cyanide in an amount sufficient to complex the copper cyanide and to provide from 0.5 to 2 ounces per gallon of free lithium cyanide. Two moles of lithium cyanide are required to complex one mole of copper cyanide to produce $Li_2Cu(CN)_3$. The amount of lithium hydroxide required to provide a pH of 12 is approximately 1 ounce per gallon. The amount of lithium hydroxide introduced into the electrolyte may be increased with satisfactory plating results up to a point where it is no longer soluble in the solution, the pH being well above 13.

It has been found that there may also be present in the electrolyte of this invention concentrations of sodium or potassium ions, or both, in an amount up to 9 ounces per gallon to replace not over 30 mole percent of the lithium ions. If the concentration of the sodium and potassium ions is maintained below this critical limit, the high current densities that are possible with the electrolyte of this invention are not materially affected.

In operation, the electrolyte is preferably maintained at a temperature of from 160° F. to 190° F.; however, the electrolyte will plate well up to the boiling point— about 212° F.—and as low as 140° F.

It is important in the practice of this invention to maintain the concentration of lithium carbonate at a minimum to prevent precipitation thereof on the work being plated. The maximum concentration of lithium carbonate should not exceed 0.6 ounce per gallon for satisfactory plating.

The following examples are illustrative of the practice of the invention:

Example I

An aqueous copper cyanide electroplating electrolyte having the following analysis was prepared:

| | Ounces per gallon |
|---|---|
| Copper | 11.0 |
| Lithium hydroxide | 3.0 |
| Free lithium cyanide | 0.7 |
| Total lithium cyanide | 12.1 |

Steel panels were plated from this electrolyte at a current density of 400 amperes per square foot at the cathode. The temperature of the bath was 180 F. The copper-plated panels produced had a light mat color over their entire surface with no indication of "burning."

Example II

An aqueous copper cyanide electroplating electrolyte was prepared having the same analysis as Example I except that 9 ounces per gallon of potassium ions were substituted for 30 mole percent of the lithium ions. Panels were plated from this bath at current densities up to 200 amperes per square foot at the cathode. The copper-plate panels produced had a light mat color with hardly noticeable "burning" at the corners. With current densities above 200 amperes per square foot, the burning became more severe, but disappeared below 200 amperes per square foot.

It is intended that all matter contained in the above specification shall be interpreted as illustrative and not in a limiting sense.

We claim as our invention:

1. An aqueous cyanide copper electroplating electrolyte comprising essentially from 8 to 15 ounces per gallon of copper as cyanide, at least 1 ounce per gallon of lithium hydroxide to provide a pH of at least 12, sufficient lithium cyanide to complex the copper cyanide, and from 0.5 to 2 ounces per gallon of free lithium cyanide.

2. The electroplating electrolyte of claim 1 in which there is present small concentrations of at least one alkali selected from the group consisting of sodium and potassium alkalies, the sodium and potassium not exceeding 30 mole percent and the lithium being at least 70 mole percent of the total alkali metal present.

3. The electroplating electrolyte of claim 2 in which there is present not more than 9 ounces per gallon of at least one ion selected from the group consisting of sodium and potassium ions.

4. An aqueous cyanide copper electroplating electrolyte composed of an aqueous solution containing from 8 to 15 ounces per gallon of copper as cyanide, at least 1 ounce per gallon of lithium hydroxide, sufficient lithium cyanide to complex the copper cyanide, lithium carbonate not in excess of 0.6 ounce per gallon, and from 0.5 to 2 ounces per gallon of free lithium cyanide.

5. In the process of plating copper on a base with an aqueous cyanide copper electroplating electrolyte, the steps comprising passing an electrical current from an anode, through the electrolyte and to the base to deposit copper on the base, the electrolyte having as its essential cations from 8 to 15 ounces per gallon of copper as cyanide and lithium present as lithium hydroxide sufficient to give a pH of at least 12, from 0.5 to 2 ounces per gallon of free lithium cyanide, and sufficient lithium cyanide to complex the copper cyanide; and maintaining the electrolyte at a temperature of from 140° F. to the boiling point.

6. In the process of plating copper on a base with an aqueous cyanide copper electroplating electroylte comprising essentially from 8 to 15 ounces per gallon copper as cyanide, at least 1 ounce per gallon of lithium hydroxide, sufficient lithium cyanide to complex the copper cyanide, and from 0.5 to 2 ounces per gallon of free lithium cyanide, the steps comprising passing an electrical current from an anode, through the electrolyte and to the base to deposit copper on the base, and maintaining the electrolyte at a temperature of from 140° F. to the boiling point.

References Cited in the file of this patent
UNITED STATES PATENTS 2,690,997    Jernstedt _____ Oct. 5, 1954